Feb. 24, 1931.   R. E. MANLEY   1,793,864
AUTOMATIC TIRE CHANGER
Filed April 3, 1928   2 Sheets-Sheet 1
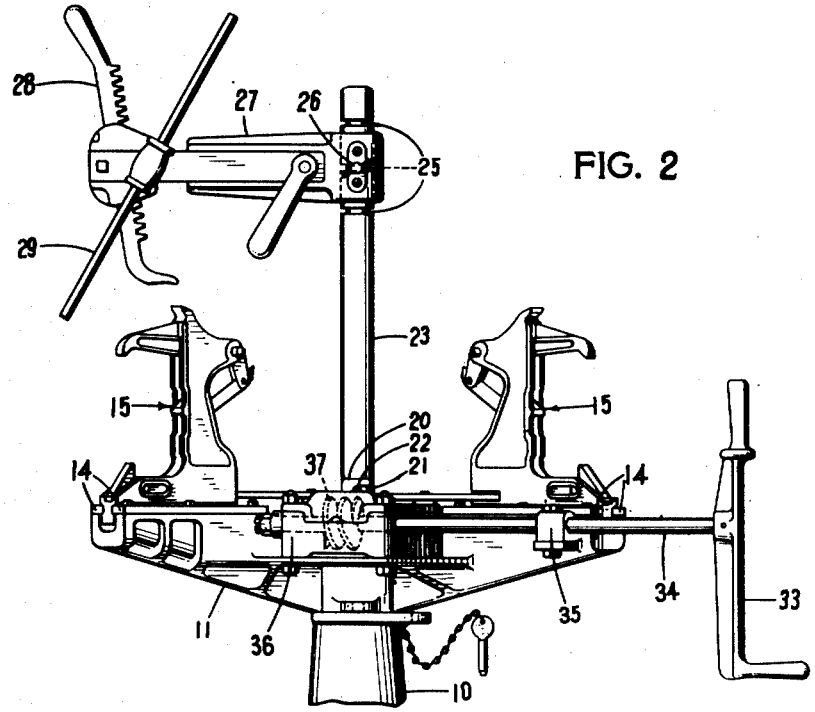
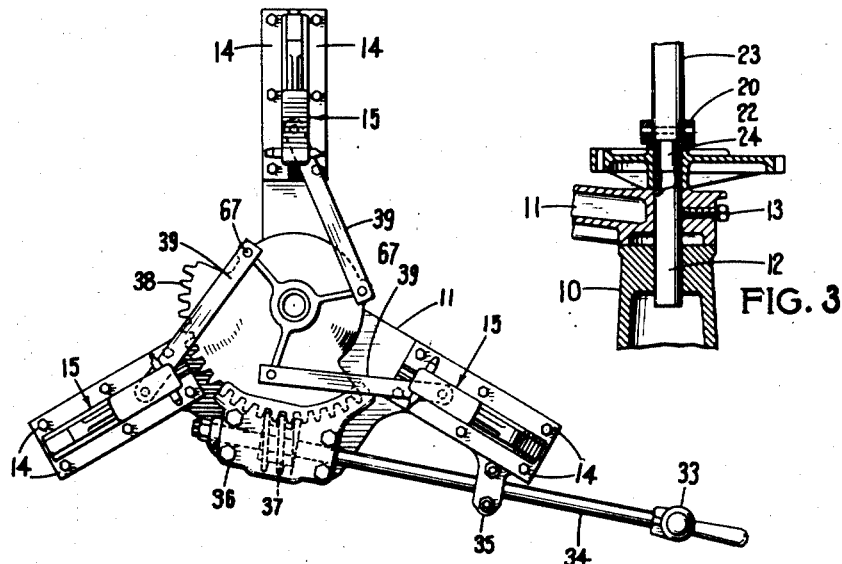
Inventor
Robert E. Manley
By H. H. Snelling
Attorney

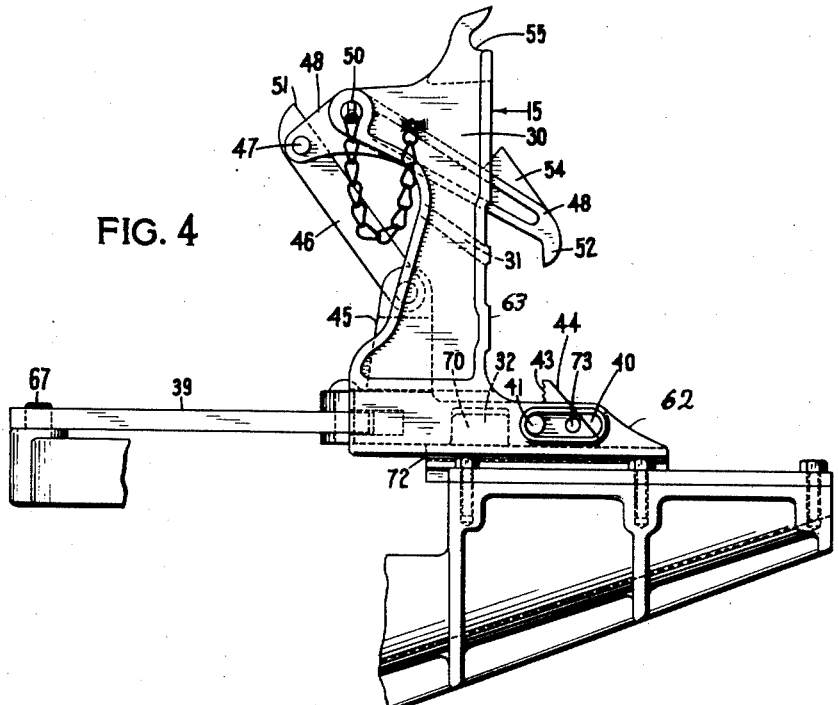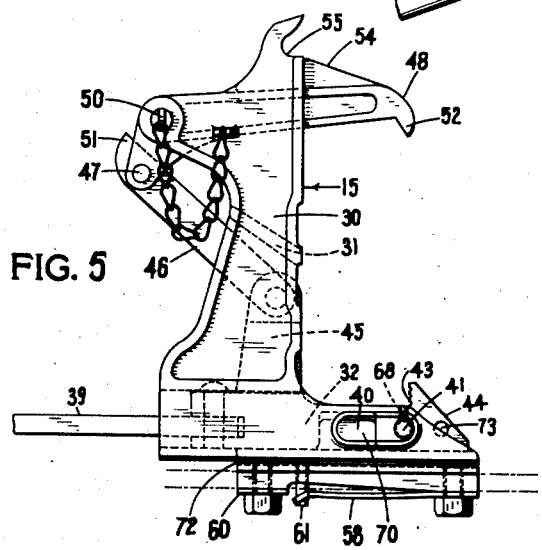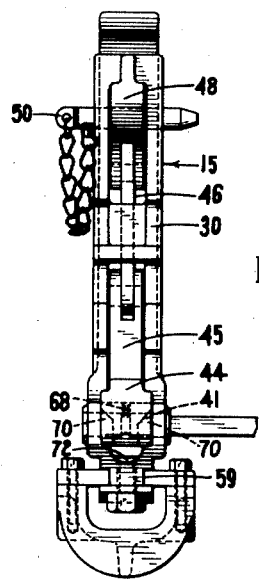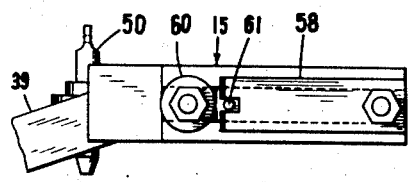

Patented Feb. 24, 1931

1,793,864

UNITED STATES PATENT OFFICE

ROBERT E. MANLEY, OF YORK, PENNSYLVANIA, ASSIGNOR TO MANLEY MANUFACTURING COMPANY, OF YORK, PENNSYLVANIA, A CORPORATION OF DELAWARE

AUTOMATIC TIRE CHANGER

Application filed April 3, 1928. Serial No. 267,023.

This invention relates to tire changers and has for its principal object the provision of a device of this type in which a solid rim is automatically guided into the holding notches of the jaws and in which a split rim is automatically positioned between the two hooks of the jaws so that the not unusual canting and twisting of the rim is entirely eliminated.

A further object of the present invention is to improve generally the jaw itself, especially rendering it convenient and easy to remove the upper hooked arm of the jaw so as to offer no obstruction to the pressing off of the tire from a solid rim. A still further improvement in the jaw lies in the provision of means whereby both jaw hooks have movement independently of the jaw body.

Other objects and advantages of the invention will be more particularly set forth in the description and in the claims.

In the drawings:—

Figure 1 is a top plan view of the tire changing mechanism.

Figure 2 is a side elevation.

Figure 3 is a section thru the center of the machine showing the method of quick attachment of the post.

Figure 4 is a side elevation of one of the jaws showing the arm lowered so as to grip a small size split rim.

Figure 5 is a fairly similar view but showing the arm in position to guide a solid rim into the notch.

Figure 6 is a front elevation of the parts as shown.

Figure 7 is a bottom plan view of one of the jaws.

The tire changing device is provided with the usual pedestal 10 upon which is mounted a casting or support 11, technically known as a spider, this support or spider being secured to a tubular shaft 12 by means of a set screw 13 so that the spider and shaft may freely revolve upon the pedestal except when the spider is locked to the pedestal by means common in the art but not shown. The three arms of the spider are of similar construction somewhat channel shaped and each receiving upon the upper surface two parallel steel guides 14 upon which slide one of the three jaws 15. The three jaws are simultaneously moved in a radial direction so as to expand, contract or hold a rim as the case may be.

The shaft 12 has at its top a cup 20 provided with bayonet slots 21 to receive the transverse pin 22 of the steel post 23 which has a portion of reduced diameter 24 fitting into the smaller bore of the sleeve 12. At its upper portion the post 23 has a plurality of annular grooves 25 to engage the spring pressed pin 26 of the tool carrying bracket 27. The pin can be withdrawn from any one of the grooves 25 so as to shift the bracket up or down the post. The bracket carries a tool 28 which can be raised or lowered by the lever 29 so as to pry a tire loose from a solid rim held in the jaws.

Having particular references now to Figures 4, 5, and 6, each of the jaws 15 consists of a body 30 generally hollow but having a sloping bridge wall 31 to strengthen this member, and a further member telescoping within the body which for convenience will be called the slide 32. The body and the slide have relative movement but also move together. This movement is given thru mechanism which is old in the art consisting of a handle 33 on a shaft 34 in bearings 35 and 36 and carrying a worm 37 meshing with a gear sector 38. Three links 39 connect the gear 38 with the three slides 32 so as to cause these three slides, and with them the jaws 15, to move radially as the worm shaft is rotated.

Each side wall of the jaw body 30 has a slot 40. A pin 41 passing thru the slide 32 is confined in the two slots 40 so that in Figure 4 the slide can move to the right or in Figure 5 it can move to the left without causing movement of the jaw body until the pin 41 reaches the other end of the slot or until the slide is otherwise arrested.

The slide has a hook or abutment, at the front end bounded on one side by the corrugated or roughened face 43 and on the front side by the sloping wall 44. Further toward the pedestal or inward of the machine is a vertical stem 45 forked at its top to receive a connector link 46 which is pivoted at 47 to the upper arm or latch 48, this member being a lever pivoted to the jaw body by the removable pin 50. The upper arm or jaw hook is forked to receive the connector link 46 which purposely extends sufficiently far beyond the pivot 47 as indicated at 51 to prevent the upper arm from getting in the way of any of the mechanism when the upper arm or hook has been dropped down out of place by removal of the pin 50.

A hook 52 is formed at the free end of the lever arm 48 and its active face is at such an angle as to be vertical or parallel to the face 43 when the slide is at the inward limit of its motion with respect to the jaw body member as shown in Figure 4. A triangular guide or rib 54 on the upper surface of the lever arm 48 is in alinement with the lower face of the notch 55 when the parts are in the position shown in Figure 5, that is, when the slide is at the forward limit of its movement with respect to the jaw body.

Since the jaw body if unhindered would slide quite freely on the guides 14, it is important to provide some frictional means to hold the jaw with respect to the spider so as to insure correct movement of the jaw hooks 43 and 52, even tho dirt and grime should become wedged between the body and the slide. For this purpose the usual bottom cleat of the jaw is replaced by a spring 58 of such width as to engage the two guides 14. The lower portion of the jaw bottom rib is recessed as at 59 so that the spring may bear firmly against the bottom of the guides with sufficient tension to overcome the resistance of dirt that may become lodged in the sliding parts in the jaw body member. A washer 60 of the same thickness as the spring 58 is secured to the inner side of the lower guiding projection of the jaw and is preferably round. The pin 61 serves merely to preserve the correct alinement of the spring 58.

Altho it is not at all difficult to slip the slide out of the body to clean out any dirt and grime, since the operating links 39 while riveted to the slides merely slip over the collared link studs 67 of the sector and the pin 41 is held only by the set screw 68, in practice this has been found necessary only under rare circumstances because the recesses 70 at each side of the slide trap any dirt that may collect and throw it into the cavity at the bottom of the jaw body which cavity is open at the rear at 72. The smaller hole 73 in the lower jaw hook is for emergency use with very large rims. By placing a nail or other object in this hole (the pin 41 being removed) the jaw body may be caused to move outwardly a greater distance than if the pin 41 were relied upon.

In the operation of the mechanism just described the first act is always to move the three jaws inwardly or close together so that the rim, whether split or solid, may be positioned over them. We will assume that the jaw body members are at their outward limit of travel and that we desire to change the tire upon a split rim. The crank 24 is first operated to bring the three jaws inward. The natural effect of this is to lower the upper hooked arm of each of the three jaws and to move the lower jaw hook inwardly as far as it will go, consequently, before lifting the rim and tire in place upon the tire changer we first reverse the movement of the crank a sufficient amount to move the pin 41 to the outer limit of its travel which is to say we move the lower hook 43 forward and we raise the upper hook or arm 48 its full extent but we do not move the jaw body which remains in place during this operation by reason of the frictional engagement of its spring 58 with the lower faces of the guides 14.

The split rim with the old tire on it is now lifted over the three jaws and may be positioned between the two jaw hooks of any one or more of the jaws. It is not at all essential that any care be given because the machine is automatic and will correctly position the rim and tire in any event due to the arcuate sloping face 62 at the front of the jaw body and the sloping wall 44 of the slide, which members will elevate the rim and tire into position should the edge of the tire be further from the center of the pedestal than is the proximate jaw. The crank is now turned still further in the last direction previously spoken of as reverse direction. Such movement is continued until the rim is within each of the three roughened abutments or hooks 43. As soon as the operator hears the three clicks or sees that the three abutments are outside of the rim edge the crank is moved in the opposite direction. Each of the three jaws are temporarily motionless but the three slides move inward until the rim is exactly coaxial with the pedestal. The pin 41 in this case does not determine the point at which the jaw body shall move, this being determined solely by the contact of the upper arm with the top of the rim which in turn is naturally dependent upon the width of the rim or as it is positioned on the tire changer its height. As soon as the rim has been gripped firmly by the three jaw hook pairs further relative movement of the body and slide is prohibited and consequently further inward movement of the slide by means of its operating link 39 is transmitted to the jaw body thru the removable pin 50 which is the pivotal axis of the upper jaw. Obviously if the upper jaw 48 is prevented from moving downwardly by any means an inward movement of the slide is accompanied by an inward movement of the jaw body. The inward movement is continued until the rim has collapsed sufficiently to free the old tire at which time the latter is lifted directly up and the rim may be released if so desired or more likely it is held in its collapsed position while a new tire is placed over the three jaws and fitted to the rim. The crank is now turned to move the three jaws outwardly. The first effect of such movement of the crank is to raise the upper arm and project the lower hook and the next effect is to move the jaw bodies by means of the pin 41 which engages the front end of the slot 40. Outward movement of the three jaws causes the rim to ride against the projections 63 on the front face of the jaw body and the rim is expanded until its two ends snap in place.

At this point the rim and its tire may not be lifted directly up because of the presence of the three upper arms 48. The arms may be removed by slipping out the pin 50 which for convenience is secured by the chain 64 to a lug on the side of each jaw, but a very simple and usually employed method is readily available due to the lost motion between the slide and the body. The crank is turned so as to move the jaw hooks inwardly without moving the jaw bodies. The tire is now lifted at any point preferably near one of the jaws. The effect of this is to move the upper jaw 48 about its pivot 50 which causes the jaw body to move inward. The crank is turned still further again to move the jaw hooks only and this frees the rim and tire at that one side. Usually the rim is now entirely free but in case it is not it may be freed readily by lifting it against whichever upper arm 48 is engaging it thus again causing a movement of that jaw body without causing any movement of the slide or sector.

It should be understood that while it is quite preferable to use both jaw hooks such action is not at all necessary except that it does prevent all twisting of the rim. The one hook method is a bit quicker and does have the advantage that when the operation is complete the rim may be lifted directly above since there is nothing in the way to prevent such movement. When it is desired to operate in this manner the three pins 50 are removed and the pivot 47 is allowed to drop back completely telescoping the front end of the upper arm 48. In the usual way the upper arm when out of position rests upon the rear edge of the sloping wall 31 but should it slip over by accident the extension 51 prevents it from getting in the way of the jaw operating link 39.

In order to operate upon a solid rim the jaw body members and connected parts are first drawn inwardly. The arms 48 are then in a lowered position and the jaw body members 15 are sufficiently close together that the solid rim may be positioned over their tops with the lower edge of the rim resting on the three ribs 54 on the upper sides of these pivoted arms. The crank 24 is then turned to move the slides 32 outwardly thus effecting a raising of the arms 48 with the rim carried thereon until in their uppermost position when the ribs 54 are alined with the tire engaging notches 55 of the jaw body members and the pins 41 are in their outer position in slots 40 ready upon further turning of the crank 24 to move the jaw body members so that notches 55 will grip the rim. Before finally tightening up the rim, however, the three slides should be "backed off" slightly when the rim is firmly seated in the three notches, in order to release the pivot pins 50 which are now removed in order to allow arms 48 to fall backwardly through the central openings in the jaw body members out of the way during the removal of the tire from the rim. The extension of the link prevents the arm from falling in the way of the operating mechanism.

When the solid rim with the tire fast thereon is thus in place the post 23 is slipped into the cup 20 of the sector shaft and a very slight angular motion locks the post in place. If the tool carrying bracket 27 is not at the most convenient height it is readily raised or lowered by pulling out the spring pressed pin 26 so as to cause it to engage one of the other grooves 25 in the post. The tire removing tool is of well known construction. When the tire has been pried loose the post 23 is removed, the jaws slid inwardly a short distance and the tire lifted off. It is so easy to remove the post 23 that while it is possible to slip a tire over the bracket and tool this is rarely done.

What I claim is:—

1. In a tire changer, the combination with a support, a plurality of jaws reciprocably mounted on the support and operating mechanism for moving said members, of pivoted means actuated by said operating mechanism for automatically positioning a tire rim in gripping relation to the jaws.

2. In a tire changer, the combination with a support, a plurality of jaws mounted on the support, each of said jaws having a notch in its upper end for gripping a solid rim, and operating mechanism for moving said jaws, of means actuated by said operating mechanism for raising the rim and guiding it into said holding notches, said means having movement independent of the jaws during said guiding movement.

3. The device of claim 2 in which the means is so mounted that it may be moved from the space under the rim after the rim is gripped in said notches so as to offer no obstruction to the removing of the tire from the rim.

4. In a tire changer, the combination with a support, a plurality of jaws mounted on the support, gripping means, and operating means including a lost motion device for moving said jaws and said gripping means, of frictional means for retarding the free movement of the jaw members with respect to the support so as to insure that the lost motion device shall operate before the jaws move.

5. In a tire changer, the combination with a support, a plurality of jaws mounted on the support and operating means for moving said jaws, of rim engaging jaw hooks loosely carried by said jaws and frictional means for retarding contracting movement of the jaws until said jaw hooks have closed upon the rim.

6. In a tire changer, the combination with a support, a plurality of jaws reciprocably mounted on the support and operating means for moving said jaws, of pairs of rim engaging members carried by each of said jaws, and means to cause said members to close and to open upon movement of said operating means.

7. In a tire changer jaw, a hook, a jaw body and automatic means for moving the hook with respect to the jaw.

8. In a tire changer, the combination with a support, a plurality of jaws thereon, of a pair of rim engaging members carried by each of said jaws, and means for causing the members to close on the work and upon such closing for causing the jaws to move radially on the stand.

9. In an apparatus of the character described, a jaw body, jaws consisting of an upper jaw, and a lower jaw movable with said jaw body, and means for causing a lowering of the upper jaw with an inward radial movement of the lower jaw.

10. In a tire changer jaw, a jaw body, and a pair of rim engaging members mounted to move together to grip a rim, means for connecting said members to prevent independent movement of either one of said members being pivoted to the jaw body and the other having sliding movement with respect to the body.

11. A tire changer including in combination, a support, a plurality of jaw body members radially movable on said support, a pair of rim engaging jaw members mounted in each of the jaw body members movable independently of the body members until the rim is gripped thereby, one of the jaws of each pair being movable radially inward to close upon the rim while the other jaw of each pair is lowered upon the rim for holding the rim within the radial grip of the first jaw, and operating mechanism for actuating the jaws into gripping position and for moving the jaw body members and jaws mounted therein radially inward into rim contracting position.

12. In a tire changer, a support, means on said support to grip a tire rim, a central post detachably carried by said support, a horizontal arm vertically adjustable on said support, presser means carried by said arm for forcing a tire from the rim, and an engaging member carried by said arm cooperating with said post to secure the arm at the desired elevation.

13. In a tire changer, a rim engaging member including a hollow jaw body member movable on said support, a jaw slidingly mounted in the base of said jaw body member, a horizontal pivot mounted in the upper portion of said jaw body member, a second jaw mounted on said pivot and a link connection between said jaws whereby a sliding movement of the first jaw with respect to the jaw body member will cause the second jaw to swing on its pivot.

14. In a tire changer, a support, three jaws each with a hook, movable radially toward a common center to contract a split rim held by the three hooks, means for holding rims of various widths in contact with the hooks, and means for connecting the holding means and the jaws so that in any position of the jaws an outward movement of the jaws will be preceded by a release of the rim by the holding means, and any inward movement of the jaw members will be preceded by a closing of the holding means upon the rim.

15. In a tire changer, a plurality of members movable into position to grip a rim, means to guide the rim into such gripped position, and means including a lost motion device for operatively connecting the members and the first mentioned means.

16. The device of claim 15 in which the guiding means includes a plurality of arms mounted on pivots freely removable from the members.

17. The device of claim 15 in which each member is notched to receive a solid rim and is separately notched to receive a split rim, and the guiding means include an arm on each member designed automatically to guide a solid rim into one notch and automatically to guide a split rim into the other notch.

18. In a tire changer, a plurality of members adapted to grip a rim, means for automatically guiding the rim into such gripped position, means for moving the guiding means radially toward and away from the center of the rim, and means including a lost motion device for each member for connecting the members and the guiding means so that all movements of the members are caused by radial movement of the guiding means.

19. In a tire changer, a support, means on said support for gripping a tire rim, a post, means on said post for forcing a tire casing from the rim so held, and means for connecting the post to the support and disconnecting same therefrom by manipulation of the post alone.

20. The device of claim 19 in which the connecting means includes a bayonet joint.

21. The device of claim 19 in which the connecting means includes a bored shaft within the support, a slotted sleeve in said shaft, a reduced portion on the post fitting within the shaft with its shoulder resting on the shoulder between the shaft and sleeve, and a pin thru the post to engage the slots in the sleeve.

In testimony whereof I affix my signature.

ROBERT E. MANLEY.